United States Patent [19]
Nishiyama

[11] Patent Number: 4,795,946
[45] Date of Patent: Jan. 3, 1989

[54] METHOD OF AND CIRCUIT FOR CORRECTING LINEARITY OF HORIZONTAL DEFLECTION SYSTEM

[75] Inventor: Mikio Nishiyama, Minami-ashigara, Japan

[73] Assignee: Fuji Photo Film Co., Ltd., Kanagawa, Japan

[21] Appl. No.: 141,733

[22] Filed: Jan. 11, 1988

[51] Int. Cl.⁴ .................. H01J 29/56; H04N 7/01
[52] U.S. Cl. .................. 315/370; 315/371; 358/140
[58] Field of Search ............ 315/370, 371, 399, 400, 315/411, 392, 408; 358/137, 140, 180, 242

[56] References Cited

U.S. PATENT DOCUMENTS

| | | | |
|---|---|---|---|
| 4,588,929 | 5/1986 | Wedam et al. | 315/371 |
| 4,691,147 | 9/1987 | Kashiwagi | 315/371 |

FOREIGN PATENT DOCUMENTS 0116371  9/1981  Japan .................................. 315/371

Primary Examiner—Theodore M. Blum
Assistant Examiner—Gregory C. Issing
Attorney, Agent, or Firm—Sughrue, Mion, Zinn, Macpeak, and Seas

[57] ABSTRACT

A CRT monitor selectively displays video signals having different numbers of scanning lines. A distortion at a substantially lefthand side of the screen of the CRT monitor is corrected by S correction capacitor and a nonlinearity correcting coil which are connected in series to a horizontal deflection yoke of the CRT monitor. A distortion at a substantially righthand side of the screen of the CRT monitor is corrected by an output signal supplied to a subyoke of the CRT monitor from a function generator, the output signal being controlled by a horizontal frequency of an applied video signal.

5 Claims, 8 Drawing Sheets

FIG.1
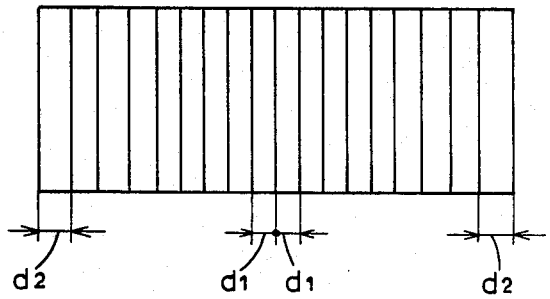
(a)
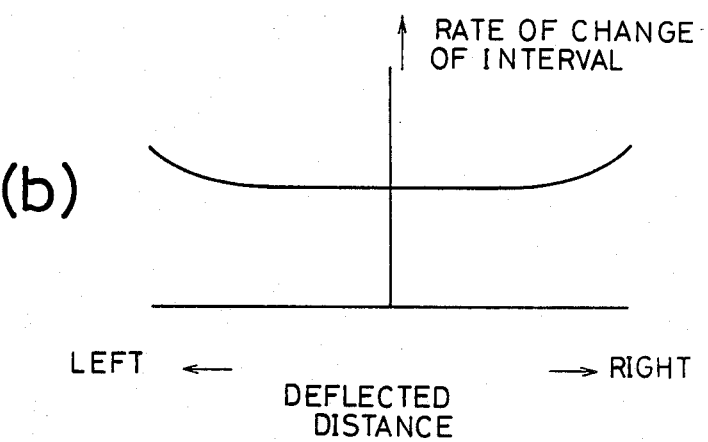
(b)

FIG.2
(a)
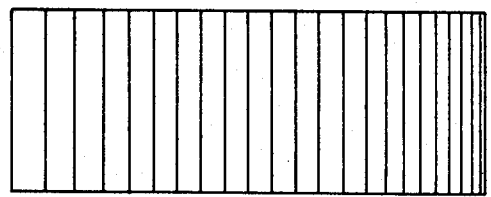
(b)
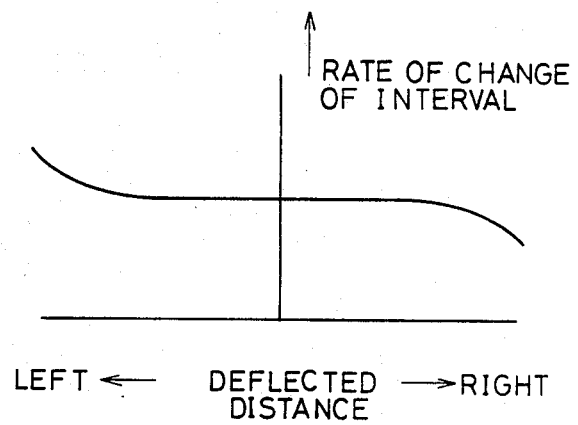

FIG. 3
(a)
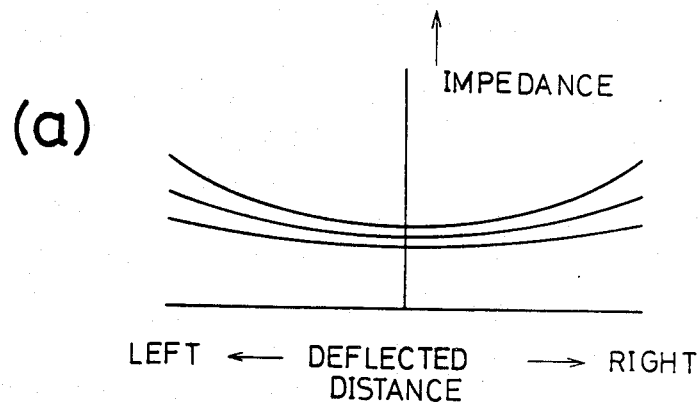
(b)
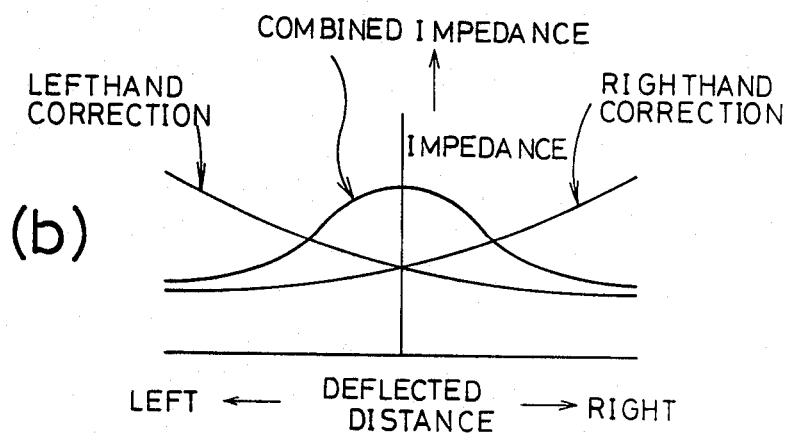

FIG. 5
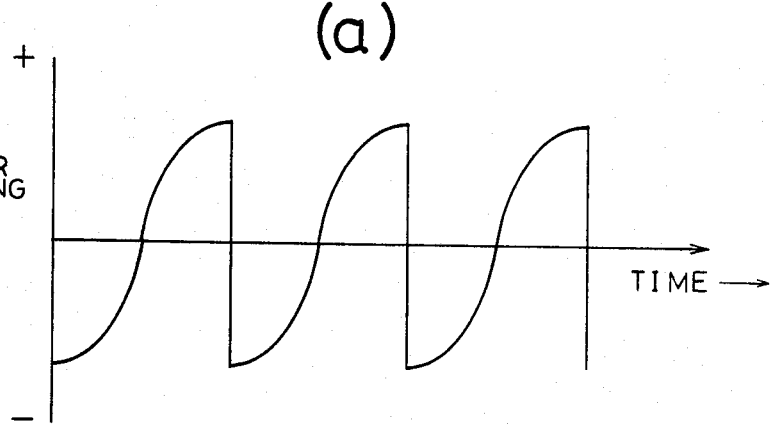
(a)
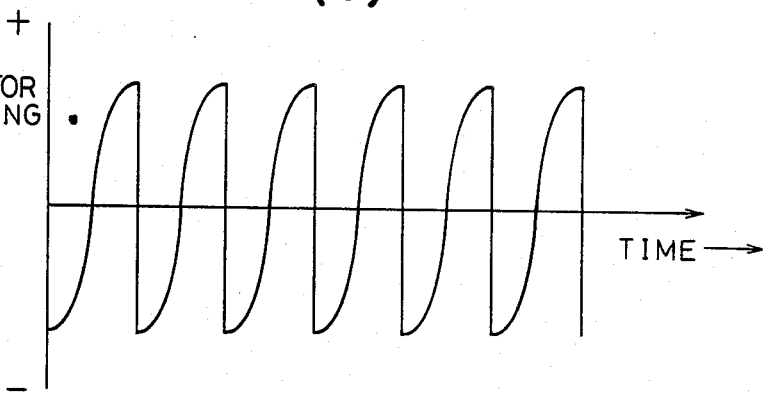
(b)

FIG.8
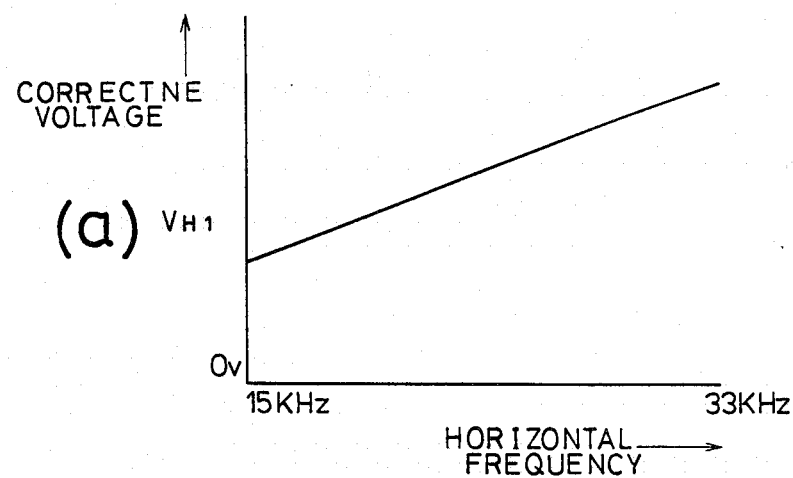
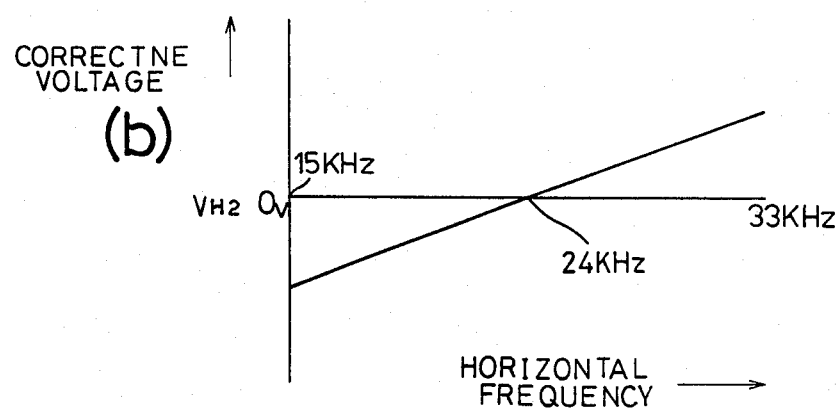

METHOD OF AND CIRCUIT FOR CORRECTING LINEARITY OF HORIZONTAL DEFLECTION SYSTEM

BACKGROUND OF THE INVENTION

The present invention relates to linearity correction for the horizontal deflection system of a CRT monitor, and more particularly to a method of and a circuit for correcting the linearity of the horizontal deflection system of a CRT monitor, when image signals from imaging devices of different numbers of scanning lines are selectively displayed on the CRT monitor, by automatically correcting a distortion for display on the CRT monitor by using a function generator which generates distortion correcting functions corresponding to the numbers of scanning lines of the image signals applied to the CRT monitor.

Image signals having different numbers of scanning lines are required to be quickly displayed selectively on one CRT monitor in such medical imaging fields as CT (computerized tomography), US (ultrasonography), and DF (digital fluorography), for example, using a plurality of medical imaging diagnostic apparatus. A diagnostic system used in such a medical imaging field of art first displays image information supplied from the plural medical imaging diagnostic apparatus on a CRT monitor, and then photographs displayed images successively on a transported film through a photographic optical system comprising a lens, a shutter device, a mirror, and the like.

With this medical imaging technology, it is possible to obtain image information of an affected part and a surrounding region of a human body continuously and quickly according to the CT, US, DF, or the like. Therefore, the affected part in question and its surrounding region can clearly be comprehended by the doctor or the like for medical diagnosis. It is important therefore to obtain exact and fine image information to avoid a wrong diagnosis. To this end, a CRT monitor with as small distortions as possible is usually employed.

The horizontal linearity of such a CRT monitor, particularly a flat-face CRT monitor, is deteriorated by the following two factors or distortions:

One of the factors is a distortion as shown in FIGS. 1(a) and 1(b) of the accompanying drawings. This distortion is a combination of image compression at the center of the fluorescent screen of the CRT and image expansion at the opposite horizontal ends thereof due to the difference between the center of curvature of the CRT fluorescent screen and the deflection center of the electron beam. FIG. 1(a) schematically shows a displayed image when an input signal indicative of an equally spaced strips is applied to a CRT monitor with no distortion correction. Stripe-to-stripe intervals $d_2$ at the opposite ends of the CRT screen are larger than stripe-to-stripe intervals $d_1$ at the center of the CRT screen. FIG. 1(b) shows a characteristic curve of such a departure from horizontal linearity. The graph of FIG. 1(b) has a horizontal axis representative of the distance that the electron beam is deflected in the horizontal direction of the CRT screen and a vertical axis representative of a rate of change of the intervals with respect to the deflected distance.

The second distortion is illustrated in FIGS. 2(a) and 2(b). This distortion is caused by the resistance or the like of the horizontal deflection yoke, which prevents the horizontal deflection current from varying linearly but causes the horizontal deflection current to vary along an exponential saturated curve. As a result, the displayed image is elongated at the lefthand side of the screen, and is contracted at the righthand side of the screen. The displayed pattern shown in FIG. 2(a) and the graph shown in FIG. 2(b) can easily be understood by referring to the description of the displayed pattern shown in FIG. 1(a) and the graph shown in FIG. 1(b).

The first distortion can be corrected by adding a series resonance current of the horizontal deflection yoke of the CRT and a DC blocking capacitor (S correction capacitor) to a horizontal scanning sawtooth current for imparting an S-shaped waveform to the deflection current. It is possible to vary the resonance impedance according to the screen surface by selecting the value of the S correction capacitor, as shown in FIG. 3(a).

The second distortion can be corrected by connecting a saturable reactor biased by a DC magnetic field to the horizontal deflection yoke, the inductance of the reactor being variable according to the delection current flowing through the reactor. By employing a plurality of saturable reactors, the distortion can be corrected appropriately by varying a combined impedance composed of a lefthand inductance and a righthand inductance, as shown in FIG. 3(b).

FIG. 4 shows a conventional circuit for correcting the above two distortions. A horizontal deflection yoke 4 for horizontally deflecting an electron beam in a CRT 2 is connected in series to an S correction capacitor 10 and linearity correcting coils 6b, 8b of saturable reactors the inductances of which can be varied dependent on the current through magnets 6a, 8a, respectively. The horizontal linearity correcting circuit composed of the capacitor 10 and the saturable reactors for correcting the first and second distortions is driven by a horizontal output circuit 22 comprising a horizontal driver transformer 12, a horizontal output transistor 14, a damper diode 16, a resonant capacitor 18, and a choke coil 20 coupled to a power supply $+V_{BB}$, for horizontally deflecting the electron beam and correcting the first distortion with S correction and the second exponential distortion.

The conventional horizontal linearity correcting circuit described above can only process a video signal having a particular number of scanning lines (horizontal frequency).

It is now assumed that a CRT monitor has 525 scanning lines (the horizontal frequency is about 15 KHz) and the power supply voltage is $+V_{BB}=15$ V, and the S correction capacitor 10 and the linearity correcting coils 6b, 8b are adjusted for an optimum linearity correction constant. However, if a video signal of 1125 scanning lines (the horizontal frequency is about 33 KHz) is applied to this CRT monitor, then the image could not accurately be reproduced since the horizontal amplitude would be reduced. In this case, in order for the deflection width of the CRT screen, i.e., the current amplitude to remain the same for such a signal of a different number of scanning lines, as shown in FIG. 5(a) and 5(b), it is necessary that the power supply voltage $+V_{BB}$ be approximately doubled to $15 \times 33$ KHz/15 KHz=33 V. As a consequence, since the impedance of each component is varied according to the change of the horizontal frequency from 15 KHz to 33 KHz, the horizontal linearity cannot be well maintained unless the S correction capacitor 10 and the linearity correcting coils 6b, 8b are readjusted to match the varied horizontal frequency.

The loss of the time required for such readjustment is highly disadvantageous in the medical imaging diagnostic apparatus which is required to quickly display images on a CRT monitor in response to video signals applied from a plurality of imaging devices.

SUMMARY OF THE INVENTION

It is a general object of the present invention to provide a method of and a circuit for correcting the linearity of the horizontal deflection system of a CRT monitor, when image signals having different numbers of scanning lines from different imaging devices of various diagnostic apparatus are selectively displayed on the CRT monitor, by automatically correcting a nonlinear distortion caused by horizontal deflection on the screen of the CRT monitor by using an S correction capacitor, a linearity correcting coil, and a subyoke, and dynamically varying the waveform of a current supplied to the subyoke, for thereby greatly reducing the nonlinear distortion caused by horizontal deflection on the CRT monitor, with the result that the time loss needed for readjustment of the linearity correcting components can be reduced.

Another object of the present invention is to provide a method of correcting linearity of the horizontal deflection system of a CRT monitor for selectively displaying video signals having different numbers of scanning lines, the method comprising the steps of correcting a distortion at a substantially lefthand side of the screen of the CRT monitor with an S correction capacitor and a nonlinearity correcting coil which are connected in series to a horizontal deflection yoke of the CRT monitor, and correcting a distortion at a substantially righthand side of the screen of the CRT monitor with an output signal supplied to a subyoke of the CRT monitor from a function generator, the output signal being controlled by a horizontal frequency of an applied video signal.

Still another object of the present invention is to provide a circuit for correcting linearity of the horizontal deflection system of a CRT monitor, comprising an S correction capacitor and a nonlinearity correcting coil which are connected in series to a horizontal deflection yoke of the CRT monitor for correcting a distortion at a substantially lefthand side of the screen of the CRT monitor, and a function generator for correcting a distortion at a substantially righthand side of the screen of the CRT monitor by supplying a subyoke of the CRT monitor with an output signal of the function generator which is controlled by a horizontal frequency of an applied video signal.

A further object of the present invention is to provide a circuit for correcting linearity, wherein the function generator incluces a multiplier having two input terminals, a series-connected circuit composed of a half-wave rectifier and an nth-power circuit (n is a natural number of at least 2) and connected to one of the input terminals of the multiplifier, and a third series-connected circuit composed of an F/V converter and a level shifter and connected to the other input terminal of the multiplier.

A still further object of the present invention is to provide a circuit for correcting linearity, wherein the nth-power circuit comprises a squarer.

A yet still further object of the present invention is to provide a circuit for correcting linearity, wherein the level shifter substantially comprises an operational amplifier and an offset varying circuit connected to an input terminal of the operational amplifier.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1(a) and 1(b) are a schematic view and a diagram showing a displayed pattern and a characteristic curve, respectively, of an S distortion on a CRT monitor;

FIGS. 2(a) and 2(b) are a schematic view and a diagram showing a displayed pattern and a characteristic curve, respectively, of an exponential distortion on a CRT monitor;

FIGS. 3(a) and 3(b) are diagrams of characteristic curves of linearity correcting components;

FIGS. 5(a) and 5(b) are diagrams of sawtooth currents for horizontal deflection;

FIGS. 8(a) and 8(b) are diagrams explaining part of characteristics of the linearity correcting circuit of the invention.

DETAILED DESCRIPTION OF THE PREFERRED EMBODIMENT

Figure 4:
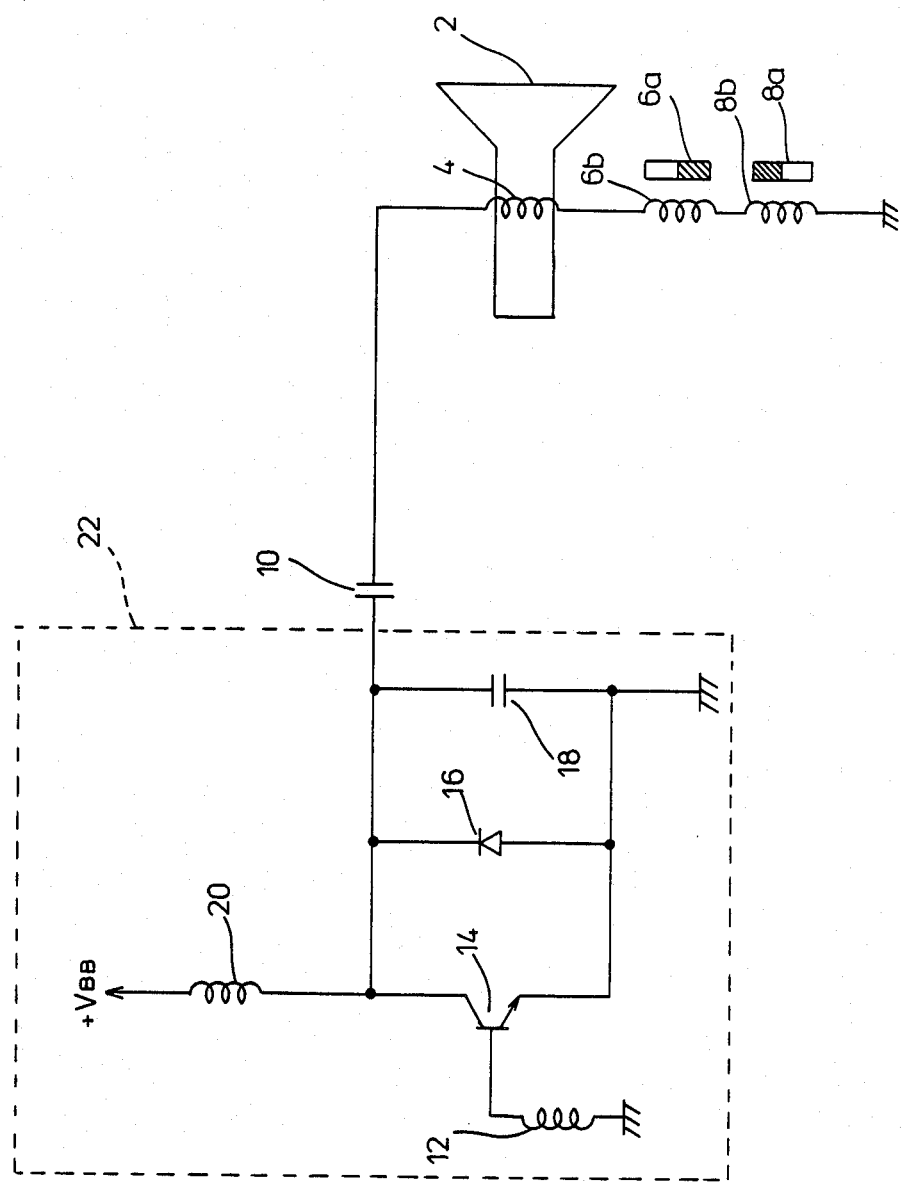
FIG. 4 is a circuit diagram of a conventional horizontal linearity correcting circuit.
Figure 6:
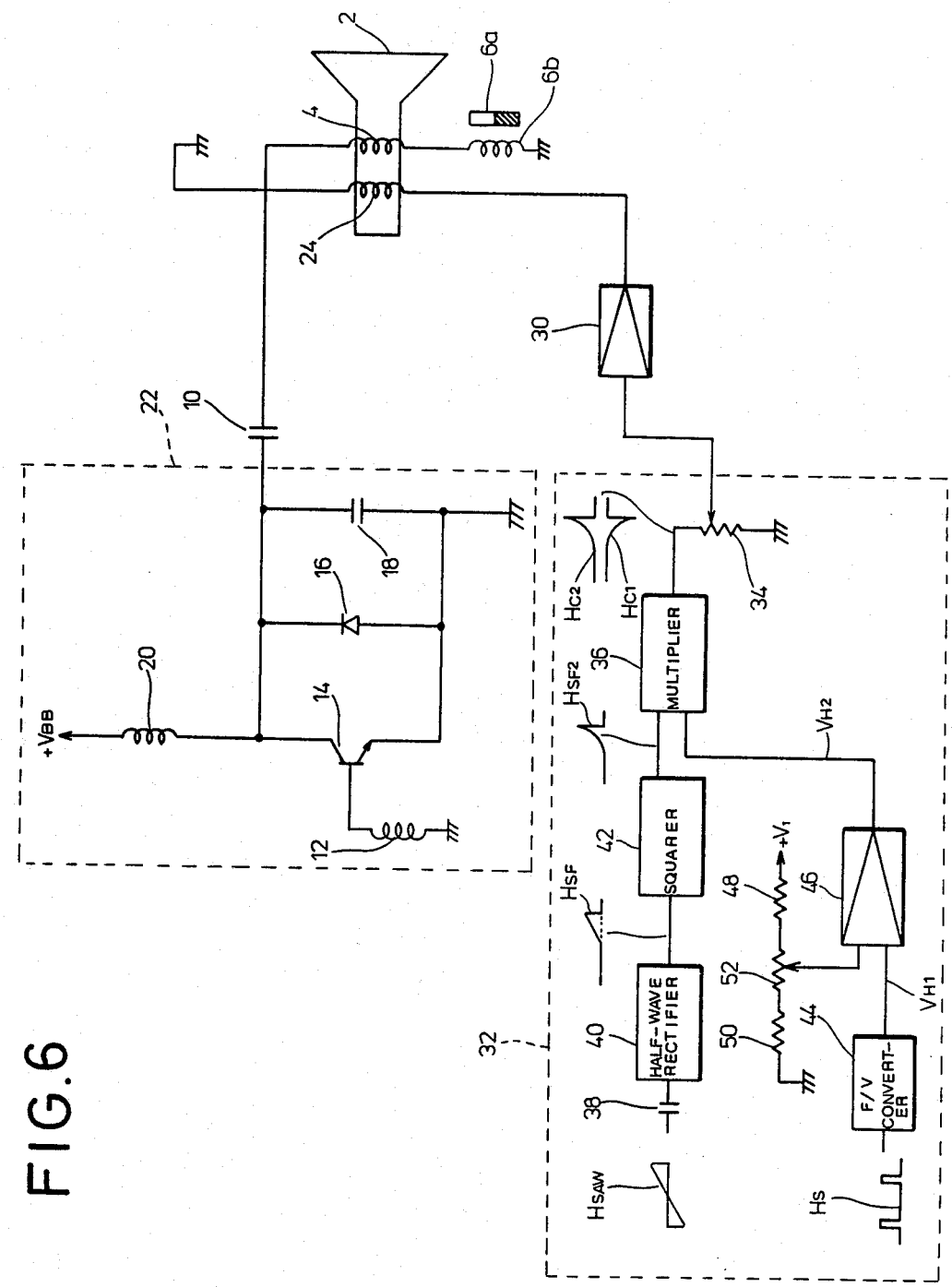
FIG. 6 is a circuit diagram of a linearity correcting circuit according to the present invention.

FIG. 6 shows a linearity correcting circuit according to the present invention. Those parts in FIG. 6 which are identical to those of FIG. 4 are denoted by identical reference numerals and will not be described in detail.

A horizontal output circuit 22 for driving a CRT 2 has an output terminal connected in series to an S correction capacitor 10, a horizontal deflection yoke 4, and a linearity correcting coil 6b with its inductance controlled by a magnet 6a. The other terminal of the linearity correcting coil 6b is grounded.

A subyoke 24 for correcting linearity has one terminal grounded and the other terminal connected to the output terminal of an adder 30. The input terminal of the adder 30 is connected to the movable contact of a rheostat 34 in a function generator 32 which generates various function voltages corresponding to various numbers of scanning lines.

One fixed terminal of the rheostat 34 is gounded, while the other fixed terminal is connected to the output terminal of a multiplier 36. The multiplier 42 has one input terminal supplied with a linearity correcting wave $H_{SF2}$ which is produced by shaping the waveform of a horizontal sawtooth wave $H_{SAW}$ with a DC blocking capacitor 38, a half-wave rectifier 40, and a squarer 42. The other input terminal of the multiplier 36 is supplied with a function waveform $V_{H2}$ (described later) which is generated by processing a horizontal synchronizing signal $H_S$ with a frequency-to-voltage (F/V) converter 44 and an operational amplifier 46. The operational amplifier 46 both amplifies the input signal and shifts the level of the input signal with the aid of an offset varying circuit comprising resistors 48, 50, a second rheostat 52, and a power supply $+V_1$.

Where the distortion the deflection system of the CRT monitor has is approximated by cubic characteristics or other nth-power chacteristics, then the squarer 42 may be replaced with a circuit for producing a cubed or nth-power output.

The linearity correcting circuit for the horizontal deflection system, thus constructed above, will operate and offer advantages as follows.

The linearity correcting circuit of the present invention basically operates to correct a lefthand distortion on the screen of the CRT 2 with the linearity correcting coil 6b and a righthand distortion on the CRT screen with the subyoke 24.

In FIGS. 7(a) through 7(e), the horizontal axis represents the deflected distance of the electron beam and the vertical axis the rate of change of the intervals between the displayed stripes.

Figure 7:
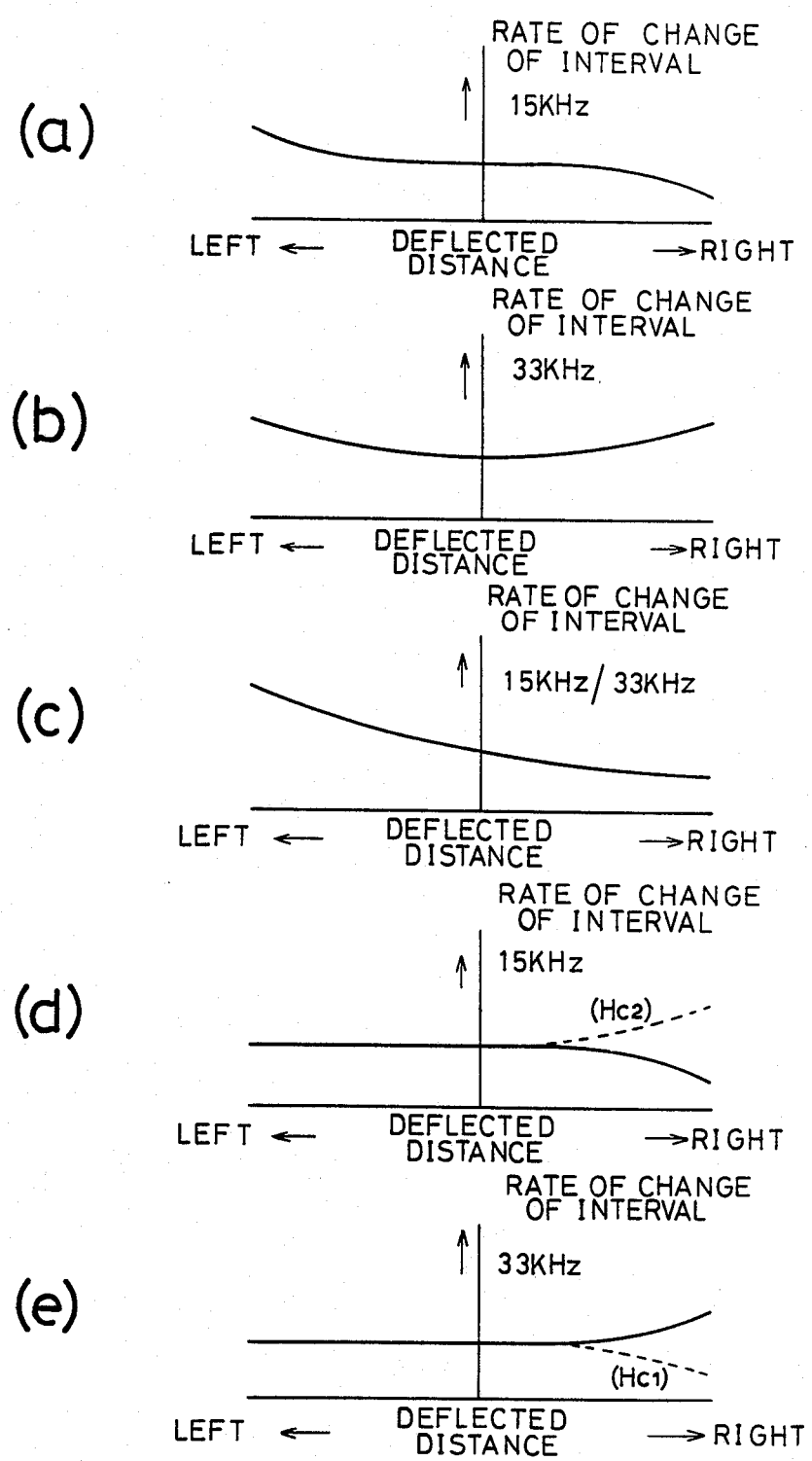
FIGS. 7(a) through 7(e) are diagrams explaining operation of the linearity correcting circuit of the invention.

It is assumed that the CRT monitor 2 has nonlinearity as shown in FIG. 7(a) with respect to a horizontal frequency, e.g., 15 KHz, corresponding to a first number of scanning lines and nonlinearity as shown in FIG. 7(b) with respect to a horizontal frequency, e.g., 33 KHz, corresponding to a second number of scanning lines. It is easy to adjust the characteristics of the linearity correcting coil 6b to the characteristics shown in FIG. 7(c). Any remaining nonlinear distortion after the nonlinearity has been corrected by the linearity correcting coil 6b having the characteristics of FIG. 7(c) is indicated by the solid-line curve in FIG. 7(d) for the horizontal frequency of 15 KHz and by the solid-line curve in FIG. 7(e) for the horizontal frequency of 33 KHz.

Now, means for generating characteristics for correcting the distortions at the righthand side of the CRT screen, as shown in FIGS. 7(d) and 7(e), will be described. If such characteristics for correcting the distortion curve of FIG. 7(d) upwardly at the righthand side of the screen for the horizontal frequency of 15 KHz and also for correcting the distortion curve of FIG. 7(e) downwardly at the righthand side of the screen for the horizontal frequency of 33 KHz can automatically be generated dependent on a change in the horizontal frequency of an applied video signal, i.e., the number of scanning lines, then it is possible to display video signals from diagnostic apparatus having different numbers of scanning lines on the same CRT monitor without significant distortions. A corrective signal for producing such correcting characteristics will be described below.

From the horizontal sawtooth wave $H_{SAW}$ in FIG. 6, there can be derived a half-wave-rectified wave $H_{SF}$ by the capacitor 38 and the half-wave rectifier 40. The half-wave-rectified wave $H_{SF}$ is then converted to a linearity correcting wave $H_{SF}$ by the squarer 42 which employs the square characteristics of a diode, for example. The linearity correcting wave $H_{SF}$ which rises to the right is applied to one of the input terminals of the multiplier 36.

A horizontal synchronizing signal $H_S$ separated from a composite video signal from the diagnostic apparatus is converted to a voltage proportional to the frequency by the F/V converter 44. The conversion characteristics of the F/V converter 44 are such that a corrective voltage $V_{H1}$ produced thereby increases in proportion to the horizontal frequency $f_H$.

The corrective voltage $V_{H1}$ is shifted in level and applied by the operational amplifier 46 into a voltage signal $V_{H2}$ having correcting characteristics shown in FIG. 8(b). The zero-crossing point of the voltage signal $V_{H2}$ is 24 KHz of the horizontal frequency $f_H$. The corrective voltage signal $V_{H2}$ is then applied to the other input terminal of the multiplier 36.

The multiplier 36 multiplies the linear correcting wave $H_{SF2}$ and the corrective voltage signal $V_{H2}$. If the horizontal frequency is 15 KHz at this time, then the input signal applied to the multiplier 36 is inversed in sign, and the multiplier 36 issues at its output terminal a first linearity corrective voltage function $H_{C1}$. If the horizontal frequency is 33 KHz at this time, then the input signal applied to the multiplier 36 is not inversed in sign, and the multiplier 36 issues at its output terminal a second linearity corrective voltage function $H_{C2}$.

These two corrective voltage functions $H_{C1}$, $H_{C2}$ are analogous to the inversions of the distortion curves indicated by the solid lines in FIGS. 7(d) and 7(e), respectively. The corrective voltage function $H_{C1}$ or $H_{C2}$ is then reduced by the first rheostat 30 to a suitable voltage which is then converted to a distortion correcting current by the adder 30. The distortion correcting current is then supplied to the subyoke 24 of the CRT 2 to correct the horizontal nonlinear distortion. The ratios of change of the intervals, corresponding to the distortion correcting currents obtained from the corrective voltage functions $H_{C1}$, $H_{C2}$ are indicated by the broken lines in FIGS. 7(d) and 7(e).

With the present invention, as described above, when video signals having different numbers of scanning lines supplied from different imaging devices of various diagnostic apparatus are selectively displayed on one CRT monitor, a nonlinear distortion caused by horizontal deflection on the screen of the CRT monitor can automatically be corrected by providing the S correction capacitor, the linearity correcting coil, the subyoke, and the function generator to dynamically vary a corrective current supplied to the subyoke, dependent on the number of scanning lines of an applied video signal. As a result, the nonlinear distortion caused by horizontal deflection on the CRT monitor can be reduced, and any time loss which would otherwise be required by readjustment of the correcting components can greatly be reduced.

Although a certain preferred embodiment has been shown and described, it should be understood that many changes and modifications may be made therein without departing from the scope of the appended claims.

What is claimed is:

1. A method of correcting linearity of the horizontal deflection system of a CRT monitor for selectively displaying video signals having different numbers of scanning lines, said method comprising the steps of:
   correcting a distortion at a substantially lefthand side of the screen of the CRT monitor with an S correction capacitor and a nonlinearity correcting coil which are connected in series to a horizontal deflection yoke of the CRT monitor; and
   correcting a distortion at a substantially righthand side of the screen of the CRT monitor with an output signal supplied to a subyoke of the CRT monitor from a function generator, the output signal being controlled by a horizontal frequency of an applied video signal.

2. A circuit for correcting linearity of the horizontal deflection system of a CRT monitor, comprising:
   an S correction capacitor and a nonlinearity correcting coil which are connected in series to a horizontal deflection yoke of the CRT monitor for correcting a distortion at a substantially lefthand side of the screen of the CRT monitor; and a function generator for correcting a distortion at a substantially righthand side of the screen of the CRT monitor by supplying a subyoke of the CRT monitor with an output signal of the function generator which is controlled by a horizontal frequency of an applied video signal.

3. A circuit according to claim 2, wherein said function generator incluces a multiplier having two input terminals, a series-connected circuit composed of a half-wave rectifier and an nth-power circuit (n is a natural number of at least 2) and connected to one of said input terminals of said multiplifier, and a third series-connected circuit composed of an F/V converter and a level shifter and connected to the other input terminal of said multiplier.

4. A circuit according to claim 3, wherein said nth-power circuit comprises a squarer.

5. A circuit according to claim 3, wherein said level shifter substantially comprises an operational amplifier and an offset varying circuit connected to an input terminal of said operational amplifier.

* * * * *